US009591533B2

United States Patent
Song et al.

(10) Patent No.: US 9,591,533 B2
(45) Date of Patent: Mar. 7, 2017

(54) INDICATION METHOD AND DEVICE FOR MEASUREMENT PARAMETER

(71) Applicant: ZTE CORPORATION, Shenzhen, Guangdong Province (CN)

(72) Inventors: Sida Song, Shenzhen (CN); Yang Sun, Shenzhen (CN); Yun Zhu, Shenzhen (CN)

(73) Assignee: ZTE CORPORATION (CN)

( * ) Notice: Subject to any disclaimer, the term of this patent is extended or adjusted under 35 U.S.C. 154(b) by 26 days.

(21) Appl. No.: 14/420,289

(22) PCT Filed: Jun. 9, 2013

(86) PCT No.: PCT/CN2013/077090
§ 371 (c)(1),
(2) Date: Mar. 17, 2015

(87) PCT Pub. No.: WO2013/178102
PCT Pub. Date: Dec. 5, 2013

(65) Prior Publication Data
US 2015/0208296 A1 Jul. 23, 2015

(30) Foreign Application Priority Data
Aug. 9, 2012 (CN) .......................... 2012 1 0281716

(51) Int. Cl.
*H04W 48/16* (2009.01)
*H04B 17/24* (2015.01)
(Continued)

(52) U.S. Cl.
CPC ........ *H04W 36/0083* (2013.01); *H04B 17/24* (2015.01); *H04W 48/16* (2013.01); *H04W 48/12* (2013.01)

(58) Field of Classification Search
CPC ..... H04L 5/001; H04L 5/0035; H04L 5/0053; H04L 5/0064; H04L 5/0073;
(Continued)

(56) References Cited

U.S. PATENT DOCUMENTS 8,503,942 B2 * 8/2013 Kazmi ................. H04W 36/30
370/328
2010/0271965 A1 * 10/2010 Siomina ................ H04L 5/0048
370/252
(Continued)

FOREIGN PATENT DOCUMENTS

CN 101064899 A 10/2007
CN 102802187 A 11/2012
(Continued)

OTHER PUBLICATIONS

NEC "Signalling of cell BW and frequency over X2 interface" 3GPP TSG-RAN WG3 #59bis Kansas City, US, May 5-9, 2008, R3-081406.
(Continued)

*Primary Examiner* — Michael Thier
*Assistant Examiner* — Eric Nowlin
(74) *Attorney, Agent, or Firm* — Plumsea Law Group, LLC

(57) ABSTRACT

A method and device for indicating measurement parameters are disclosed. The method for indicating the measurement parameters includes: a base station of a serving cell acquiring frequency band usage information of neighboring cells of the serving cell; according to a frequency band used by the base station itself and the obtained frequency band usage information of all the neighboring cells, the base station of the serving cell determining measurement parameters of a mobile station which accesses the base station of the serving cell, wherein, the measurement parameters include: measurement frequency points and measurement bandwidths at all the measurement frequency points; and the base station of the serving cell indicating the measurement parameters to the mobile station which accesses the base station of the serving cell. With the method and device of the present
(Continued)

document, a flexibility of measurement bandwidths and an accuracy of measurement can be improved.

18 Claims, 6 Drawing Sheets

(51) Int. Cl.
*H04W 48/12* (2009.01)
*H04W 36/00* (2009.01)

(58) Field of Classification Search
CPC ............... H04L 5/0092; H04W 24/10; H04W 36/0083; H04W 36/0088; H04W 36/30; H04W 48/12; H04W 48/16; H04B 17/24; H04B 17/318; H04B 17/327
See application file for complete search history.

(56) References Cited

U.S. PATENT DOCUMENTS

| 2011/0110254 | A1* | 5/2011 | Ji | H04W 36/0066 370/252 |
| 2011/0110327 | A1* | 5/2011 | Ramachandran | H04W 8/205 370/331 |
| 2012/0195238 | A1* | 8/2012 | Li | H04W 36/0016 370/280 |
| 2013/0217395 | A1* | 8/2013 | Suzuki | H04W 36/0088 455/437 |
| 2015/0289156 | A1* | 10/2015 | Jung | H04W 24/10 370/252 |

FOREIGN PATENT DOCUMENTS

| WO | 2008/097185 A2 | 8/2008 |
| WO | 2009/057729 A2 | 5/2009 |

OTHER PUBLICATIONS

NEC "Signalling of cell BW and frequency over X2 interface" 3GPPTSG-RAN WG3#60 Kansas City, USA May 5-9, 2008, R3-081405.

Qualcomm Incorporated "Wideband RRM Measurements" 3GPP TSG-RAN WG4 #63AH Jun. 26-28, 2012, R4-63AH-0061.

European Search Report issued Sep. 29, 2015 in European Patent Application No. EP13797533.0.

* cited by examiner

INDICATION METHOD AND DEVICE FOR MEASUREMENT PARAMETER

CROSS-REFERENCE TO RELATED APPLICATION(S)

This application is the U.S. National Phase application of PCT application number PCT/CN2013/077090 having a PCT filing date of Jun. 9, 2013, which claims priority of Chinese patent application 201210281716.4 filed on Aug. 9, 2012, the disclosures of which are hereby incorporated by reference.

TECHNICAL FIELD

The present document relates to the field of communication, and specifically, to a method and device for indicating measurement parameters.

BACKGROUND

With the booming development of the mobile communication technology, a wireless communication system reveals the tendency towards mobility, broadband and Internet Protocol (IP). A Long Term Evolution (LTE) project is an evolution of the 3rd Generation (3G), the LTE uses Orthogonal Frequency Division Multiplexing (OFDM) and Multiple-Input Multiple-Out-put (MIMO) as the sole criterion of the wireless network evolution, and a main purpose is to improve the performance of cell edge users, increase cell capacity and lower system delay.

LTE-Advanced (LTE-A) further extends the performance of the LTE, and its key techniques include carrier aggregation, relay and heterogeneous network and so on. Handover serves as an important function in the radio resource management, a success of the handover depends a lot on a measurement accuracy of a mobile station. If the mobile station cannot perform measurement accurately and reflect a channel condition to a base station, the handover cannot be performed successfully, thus causing too early or too late handover, and this is extremely disadvantageous to service with higher delay requirements, for example, with regard to a voice service, a call drop may appear, which will seriously impact the conversation quality of users.

In Evolved Universal Terrestrial Radio Access (E-UTRA), in order to flexibly deploy the network, various system bandwidths are supported, such as 1.4 MHz, 3 MHz, 5 MHz, 10 MHz, 15 MHz and 20 MHz. Primary Synchronization Signal (PSS)/Secondary Synchronization Signal (SSS) and a Physical Broadcast Channel (PBCH) are allocated on the central 6 Resource Blocks (RBs) for cell searching, which can be independent of different channel bandwidths. In addition, narrowband measurement bandwidth also contributes to reducing the energy overhead and lowering a processing complexity of a User Equipment (UE) and so on. However, in a scenario of Heterogeneous Network (HetNet) or Carrier Aggregation (CA), the deployment of part of common channels probably exists, that is, a Macro cell, a Pico cell and a Femto cell use different channel bandwidths, that is, a serving cell and a neighboring cell use different bandwidths, for example, the serving cell is a 10 MHz Evolved Universal Terrestrial Radio Access Network (E-UTRAN), and the neighboring cell is a 5 MHz E-UTRAN. The scenario may refer to FIG. 1. In such case, if a terminal within the serving cell fixedly performs measurement on the center 6 RBs, an inaccurate measurement will be caused. For example, in a scenario shown in FIG. 1, if there is 0.5 MHz protection bandwidth between two narrowband systems, when the mobile station uses the center 6 RBs to perform Radio Resource Management (RRM) measurement within a 10 MHz system, bandwidths of the two narrowband systems fallen into a measurement range are only $2*(6*0.18/2-0.5/2)=0.58$ MHz (about 3.2 RB), and then a channel condition of the current cell is estimated according a measurement result of the measurement range, thus the inaccurate measurement is caused.

SUMMARY

With respect to a problem that the narrowband measurement of a mobile station of a serving cell is inaccurate in a scenario of different cells using different bandwidths in the related art, the embodiments of the present document provide a scheme for indicating measurement bandwidths, to at least solve the above problem.

The embodiment of the present document provides a method for indicating measurement parameters, which comprises:

a base station of a serving cell acquiring frequency band usage information of neighboring cells of the serving cell;

according to a frequency band used by the base station itself and the obtained frequency band usage information of all the neighboring cells, the base station of the serving cell determining measurement parameters of a mobile station which accesses the base station of the serving cell, wherein, the measurement parameters comprise: measurement frequency points and measurement bandwidths at all the measurement frequency points; and the base station of the serving cell indicating the measurement parameters to the mobile station which accesses the base station of the serving cell.

Alternatively, the step of a base station of a serving cell acquiring frequency band usage information of neighboring cells of the serving cell comprises:

with regard to a neighboring cell belonging to the base station of the serving cell, the base station of the serving cell acquiring locally stored frequency band usage information of the neighboring cell; and with regard to a neighboring cell not belonging to the base station of the serving cell, the base station of the serving cell acquiring frequency band usage information of the neighboring cell from a base station of the neighboring cell via an interface between the base station of the serving cell and the base station of the neighboring cell, or the base station of the serving cell acquiring frequency band usage information of the neighboring cell by communicating with an upper layer via an interface.

Alternatively, in the step of the base station of the serving cell determining measurement parameters of a mobile station which accesses the base station of the serving cell according to a frequency band used by the base station itself and the obtained frequency band usage information of all neighboring cells, when it is determined that a number of measurement frequency points of the mobile station which accesses the base station of the serving cell N>1, a sum of the measurement bandwidths at all the measurement frequency points is a total measurement bandwidth, wherein, N is a positive integer.

Alternatively, the step of the base station of the serving cell indicating the measurement parameters to the mobile station which accesses the base station of the serving cell comprises:

the base station of the serving cell sending a message to the mobile station, wherein, the message carries a parameter indicating the measurement frequency points and a parameter indicating the measurement bandwidths.

Alternatively, the parameter indicating the measurement frequency points comprises: a center frequency of the serving cell and offsets of all the measurement frequency points relative to the center frequency, or values of all the measurement frequency points.

Alternatively, the measurement bandwidths at all the measurement frequency points are equal; the parameter indicating the measurement bandwidths comprises: the total measurement bandwidth, or a measurement bandwidth of a single measurement frequency point.

Alternatively, the message is sent through a System Information Block (SIB) or a control signaling.

Alternatively, each of the measurement frequency points is a center frequency point of each of the neighboring cells.

Alternatively, after the step of the base station of the serving cell indicating the measurement parameters to the mobile station which accesses the base station of the serving cell, the method further comprises: the mobile station performing measurement according to the measurement parameters indicated by the base station of the serving cell.

The embodiment of the present document further provides a device for indicating measurement parameters, which is located in a base station, and comprises:

an acquisition module, configured to: acquire frequency band usage information of neighboring cells of a serving cell, wherein, the frequency band usage information comprises: carrier frequencies of the neighboring cells and system bandwidths of the neighboring cells;

a determination module, configured to: according to a frequency band used by the base station and the obtained frequency band usage information of all the neighboring cells, determine measurement parameters of a mobile station which accesses the base station, wherein, the measurement parameters comprise: measurement frequency points and measurement bandwidths at all the measurement frequency points; and an indication module, configured to: indicate the measurement parameters to the mobile station which accesses the base station.

Alternatively, the acquisition module comprises:

a first acquisition unit, configured to: with regard to a neighboring cell belonging to the base station, acquire locally stored frequency band usage information of the neighboring cell; and a second acquisition unit, configured to: with regard to a neighboring cell not belonging to the base station, acquire frequency band usage information of the neighboring cell from a base station of the neighboring cell via an interface between the base station and the base station of the neighboring cell, or acquire frequency band usage information of the neighboring cell by communicating with an upper layer via an interface.

The embodiment of the present document further provides a base station, which comprises the above device for indicating the measurement parameters.

The embodiment of the present document further provides a method for cell measurement, which comprises:

a mobile station receiving measurement parameters indicated by a base station of a serving cell which the mobile station accesses, wherein, the measurement parameters comprise: measurement frequency points and measurement bandwidths at all the measurement frequency points; and the mobile station performing cell measurement according to the measurement parameters.

Alternatively, the step of a mobile station receiving measurement parameters indicated by a base station of a serving cell which the mobile station accesses comprises:

the mobile station receiving a message sent by the base station of the serving cell, wherein, the message carries a parameter indicating the measurement frequency points and a parameter indicating the measurement bandwidths.

Alternatively, the parameter indicating the measurement frequency points comprises: a center frequency of the serving cell and offsets of all the measurement frequency points relative to the center frequency, or values of all the measurement frequency points.

Alternatively, the measurement bandwidths at all the measurement frequency points are equal, and a sum of the measurement bandwidths at all the measurement frequency points is a total measurement bandwidth; the parameter indicating the measurement bandwidths comprises: the total measurement bandwidth, or a measurement bandwidth of a single measurement frequency point.

Alternatively, the message is sent through a System Information Block (SIB) or a control signaling.

Alternatively, each of the measurement frequency points is a center frequency point of each of the neighboring cells.

Alternatively, the step of the mobile station performing cell measurement according to the measurement parameters comprises:

the mobile station performing measurement on the measurement bandwidths at all the measurement frequency points when executing measurement every time.

The embodiment of the present document further provides a device for cell measurement, which is located in a mobile station, and comprises:

a receiving module, configured to: receive measurement parameters indicated by a base station of a serving cell which the mobile station accesses, wherein, the measurement parameters comprise: measurement frequency points and measurement bandwidths at all the measurement frequency points; and a measurement module, configured to: perform cell measurement according to the measurement parameters.

Alternatively, the measurement module is configured to perform measurement by means of: performing measurement on the measurement bandwidths at all the measurement frequency points when executing measurement every time.

The embodiment of the present document further provides a mobile station, which comprises the above device for cell measurement.

Through the method and device of the embodiments of the present document, the problem that the narrowband measurement of the mobile station of the serving cell is inaccurate in a scenario of different cells using different bandwidths is solved, thereby improving a flexibility of measurement bandwidths and an accuracy of measurement.

BRIEF DESCRIPTION OF THE DRAWINGS

Here, the described accompanying drawings are used to provide a further understanding of the embodiments of the present document and constitute a part of the document. The schematic embodiments and illustrations thereof of the present document are used to explain the technical scheme of the present document, but do not constitute an inappropriate limitation on the technical scheme of the present document. In the drawings.

PREFERRED EMBODIMENTS OF THE DOCUMENT

The technical scheme of the present document will be described in detail in combination with the accompanying drawings and embodiments below. It should be noted that the embodiments in the present document and the characteristics in the embodiments can be combined with each other in the condition of no conflict.

The embodiment of the present document provides a method for a network side controlling a mobile station to select RRM measurement bandwidth, and particularly, the method can be applied in an E-UTRAN system, which solves the problem that the narrowband measurement of the mobile station of the serving cell is inaccurate in a scenario of different cells using different bandwidths.

In the embodiment of the present document, an improved base station is provided, the base station determines an actual usage scenario by obtaining frequency band usage conditions of neighboring cells of the serving cell, and then determines measurement parameters of a mobile station which accesses the base station.

In the embodiment of the present document, a device for indicating measurement parameters can be set in the base station, the indication device determines measurement parameters in the movement, and provides the measurement parameters to the mobile station.

Figure 1:
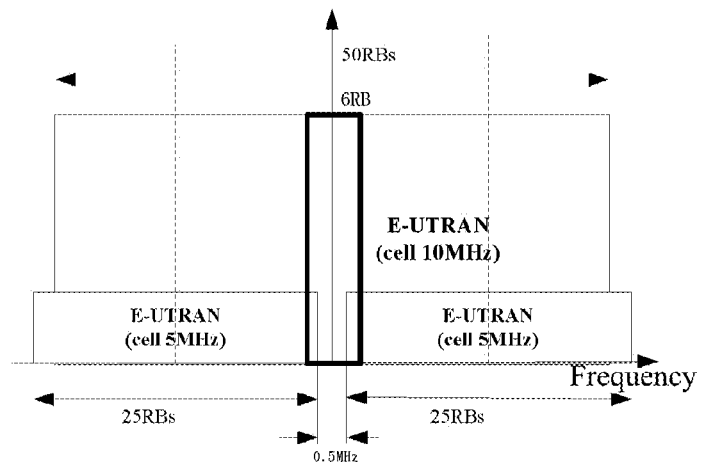
FIG. 1 is a schematic diagram of frequency spectrum of a mobile station performing narrowband measurement in a case that a serving cell and a neighboring cell use different bandwidths in the related art.
Figure 2:
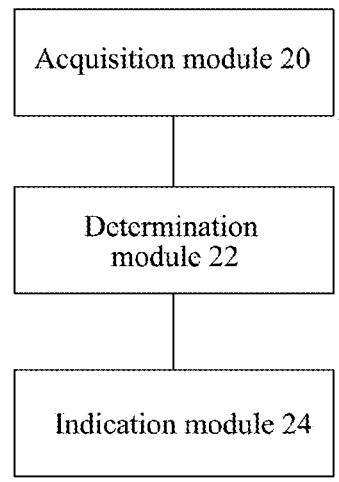
FIG. 2 is a schematic diagram of a structure of a device for indicating measurement parameters according to the embodiment of the present document.

FIG. 2 is a schematic diagram of a structure of the device for indicating measurement parameters according to the embodiment of the present document, as shown in FIG. 2, the device includes: an acquisition module 20, configured to: acquire frequency band usage information of neighboring cells of a serving cell, wherein, the frequency band usage information includes: carrier frequencies of the neighboring cells and system bandwidths of the neighboring cells; a determination module 22, configured to: be coupled with the acquisition module 20, and according to a frequency band used by the base station and the obtained frequency band usage information of all the neighboring cells, determine measurement parameters of a mobile station which accesses the base station, wherein, the measurement parameters include: measurement frequency points and measurement bandwidths at all the measurement frequency points; and an indication module 24, configured to: be coupled with the determination module 22, and indicate the measurement parameters to the mobile station which accesses the base station.

Through the above device provided in the embodiment of the present document, the measurement parameters of the mobile station can be determined according to the frequency band usage information of the neighboring cells of the serving cell, and the measurement frequency points are not fixed at a frequency center of the serving cell, which avoids the problem that it is easy to optimistically estimate a channel condition due to inadequate measurement on interferences within the bandwidths in certain scenarios when the measurement is only performed on the center 6 RB, and avoids the problem that there may be an inaccurate measurement when the measurement is only performed on the center 6 RB, thereby improving an accuracy of measurement.

Figure 3:
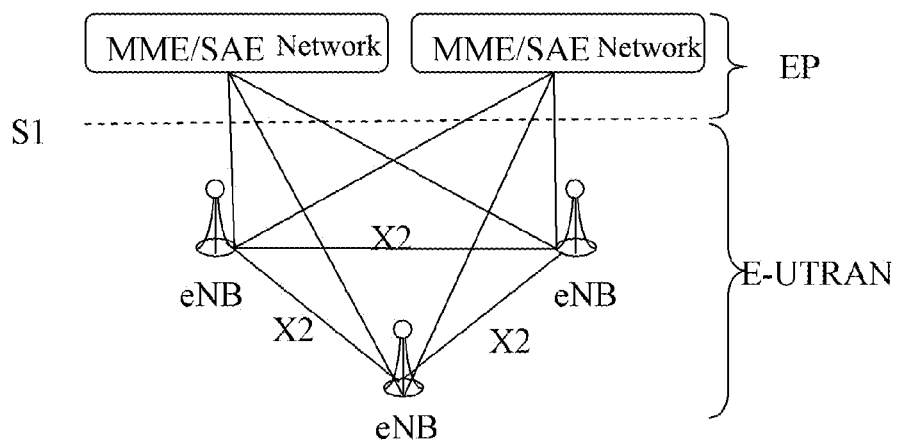
FIG. 3 is a schematic diagram of system architecture of an E-UTRAN system.
Figure 4:
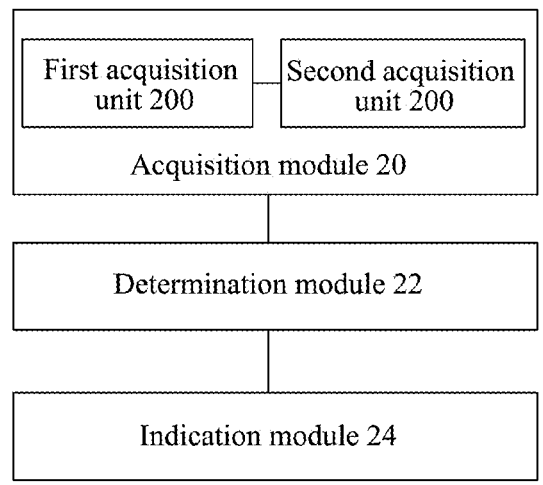
FIG. 4 is a schematic diagram of a structure of a device for indicating measurement parameters according to the preferred embodiment of the present document.

In the embodiment of the present document, with regard to different cells belonging to the same base station, bandwidth and frequency point information of all cells can be directly obtained within the base station, and with regard to different cells belonging to different base stations, bandwidth and frequency point information of neighboring cells can be acquired through an interface between the base stations or a communication with an upper layer. For example, in the E-UTRAN system as shown in FIG. 3, communication can be performed directly between eNodeBs of the E-UTRAN via an X2 interface, or an eNodeB can directly communicate with the upper layer via an S1 interface, so as to obtain a condition of bandwidths and frequency points used by the neighboring cell systems. Therefore, in one preferred embodiment, as shown in FIG. 4, the acquisition module 20 can include: the first acquisition unit 200, configured to: with regard to a neighboring cell belonging to the base station, acquire locally stored frequency band usage information of the neighboring cell; and the second acquisition unit 202, configured to: with regard to a neighboring cell not belonging to the base station, acquire frequency band usage information of the neighboring cell from a base station of the neighboring cell via an interface between the base station and the base station of the neighboring cell, or acquire frequency band usage information of the neighboring cell by communicating with an upper layer via an interface.

In one preferred embodiment of the embodiments of the present document, the determination module 22 can determine the number N of measurement frequency points and measurement bandwidths at all the measurement frequency points of the mobile station which assesses the base station by means of:

$$N=(B_{serv}-W_{gap})/Bn_{neigh}$$

$$BW_n=B_{meas}/N;$$

wherein, $BW_n$ is a measurement bandwidth at the nth measurement frequency point, $BW_1=BW_2=\ldots=BW_N$, $B_{meas}$ is a total measurement bandwidth, is a bandwidth of the serving cell, is a bandwidth of the neighboring cell, $W_{gap}$ is a sum of protection bandwidths between neighboring cells; wherein, the value of N is computed by rounding, and N is a positive integer. When N>1, all the measurement frequency points are spaced on bandwidth.

In the TS36.101, it is specified that a bandwidth utilization rate of the LTE system is 90%, that is, only 9 M is used in 10 M, 4.5 M in 5 M, 2.7 M in 3 M, and 1.26 M in 1.4 M. The rest 10% bandwidths are taken as protection bandwidths for other neighboring systems.

Under an assumption in the embodiments of the present document, center frequency intervals of neighboring cells are different in different scenarios, a center frequency interval of a 5 M neighboring cell is 5 M, a center frequency interval of a 3 M neighboring cell is 3 M, and a center frequency interval of a 1.4 M neighboring cell is 1.4 M.

The amount of interval bandwidth between neighboring cell systems is equal to the center frequency interval of the neighboring cell minus an actual usage bandwidth of the neighboring cell system, for example, an interval bandwidth between 5 M neighboring cells is 5-4.5=0.5 M, an interval bandwidth between 3 M neighboring cells is 3-2.7=0.3 M, and an interval bandwidth between 1.4 M neighboring cells is 1.4-1.26=0.14 M.

For example, a bandwidth of the serving cell is 10 MHz, a bandwidth of the neighboring cell is 5 MHz, a sum of protection bandwidths is 0.5 MHz, a total measurement bandwidth is 6 RB, and with the above formula, it is to obtain that N=2 and $BW_n$ is 3 RB.

For example, a bandwidth of the serving cell is 10 MHz, a bandwidth of the neighboring cell is 3 MHz, a sum of protection bandwidths is 0.3+0.3=0.6 MHz, a total measurement bandwidth is 6 RB, and with the above formula, it is to obtain that N=3 and $BW_n$ is 2 RB.

For example, a bandwidth of the serving cell is 10 MHz, a bandwidth of the neighboring cell is 1.4 MHz, a sum of protection bandwidths is 0.14+0.14+0.14+0.14+0.14=0.7 MHz, a total measurement bandwidth is 6 RB, and with the above formula, it is to obtain that N=6 and $BW_n$ is 1 RB.

Through the preferred embodiment, it tries to distribute frequency bands for measurement into the entire system bandwidth and fully reflect an interference condition in the entire system bandwidth, which avoids the problem that it is easy to optimistically estimate a channel condition due to inadequate measurement on interferences within the bandwidths in certain scenarios when the measurement is only performed on the center 6 RB. Moreover, the measurement bandwidths are distributed evenly in the system bandwidths, thus a comparatively accurate current channel condition of the system is reflected to the greatest extent, which solves the problem that there may be an inaccurate measurement when the measurement is only performed on the center 6 RB originally.

In the embodiment of the present document, the indication module 24 can indicate the measurement parameters by sending a message to the mobile station, wherein, the message carries a parameter indicating the measurement frequency points and a parameter indicating the measurement bandwidths. For example, the message can be sent through a System Information Block (SIB), or it can be sent by means of a control signaling In one preferred embodiment of the embodiments of the present document, the parameter indicating the measurement frequency points can be a center frequency of the serving cell and offsets of all the measurement frequency points relative to the center frequency, or, it can also be values of all the measurement frequency points. For example, the values of all the measurement frequency points can be sent by means of an E-UTRA Absolute Radio Frequency Channel Number (EARFCN).

In one preferred embodiment of the embodiments of the present document, the parameter indicating the measurement bandwidths can be a total measurement bandwidth, or a measurement bandwidth of a single measurement frequency point. If the parameter indicating the measurement bandwidths is the total measurement bandwidth, since the measurement bandwidths of all the measurement frequency points are identical, the mobile station can obtain the measurement bandwidth of the single measurement frequency point in combination with the total number of the measurement frequency points indicated by the indication module 24.

It should be noted that, even though descriptions are made with the device for indicating the measurement parameters being located in the base station as an example in the above embodiments, but it is not limited to this, in practical applications, the device can also be located outside the base station, and it is to implement functions of all its modules by communicating with the base station, which will not be specifically repeated in the embodiment of the present document.

According to the embodiment of the present document, a method for indicating measurement parameters is also provided, and the method can be implemented through the device for indicating the measurement parameters provided by the embodiment of the present document above.

Figure 5:
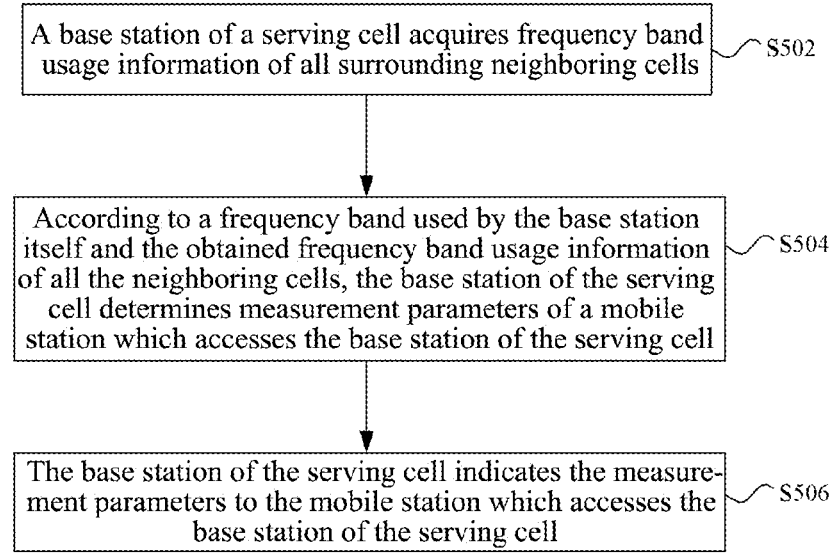
FIG. 5 is a flow chart of a method for indicating measurement parameters according to the embodiment of the present document.

FIG. 5 is a flow chart of the method for indicating the measurement parameters according to the embodiment of the present document, and as shown in FIG. 5, the method mainly includes the following steps (step S502 to step S506).

In step S502, a base station of a serving cell acquires frequency band usage information of neighboring cells of the serving cell.

In step S504, according to a frequency band used by the base station itself and the obtained frequency band usage information of all the neighboring cells, the base station of the serving cell determines measurement parameters of a mobile station which accesses the base station of the serving cell, wherein, the measurement parameters include measurement frequency points and measurement bandwidths at all the measurement frequency points.

In step S506, the base station of the serving cell indicates the measurement parameters to the mobile station which accesses the base station of the serving cell.

Through the above method provided in the embodiment of the present document, the measurement parameters of the mobile station can be determined according to the frequency band usage information of the neighboring cells of the serving cell, and the measurement frequency points are not fixed at a frequency center of the serving cell, which avoids the problem that it is easy to optimistically estimate a channel condition due to inadequate measurement on interferences within the bandwidths in certain scenarios when the measurement is only performed on the center 6 RB, and avoids a problem that there may be an inaccurate measurement when the measurement is only performed on the center 6 RB, thereby improving an accuracy of measurement.

In the embodiment of the present document, with regard to different cells belonging to the same base station, bandwidth and frequency point information of all cells can be directly obtained within the base station, and with regard to different cells belonging to different base stations, bandwidth and frequency point information of neighboring cells can be acquired through an interface between the base stations or a communication with an upper layer. For example, in the E-UTRAN system as shown in FIG. 3, communication can be performed directly between eNodeBs of the E-UTRAN via an X2 interface, or an eNodeB can directly communicate with the upper layer via an S1 interface, so as to obtain a condition of bandwidths and frequency points used by the neighboring cell systems. Therefore, in one preferred embodiment of the embodiments of the present document, the step of a base station of a serving cell acquiring frequency band usage information of neighboring cells of the serving cell includes: with regard to a neighboring cell belonging to the base station of the serving cell, the base station of the serving cell acquiring the locally stored frequency band usage information of the neighboring cell; and with regard to a neighboring cell not belonging to the base station of the serving cell, the base station of the serving cell acquiring frequency band usage information of the neighboring cell from a base station of the neighboring cell via an interface between the base station of the serving cell and the base station of the neighboring cell, or the base station of the serving cell acquiring frequency band usage information of the neighboring cell by communicating with an upper layer via an interface.

In one preferred embodiment of the embodiments of the present document, the step of the base station of the serving cell determining measurement parameters of a mobile station which accesses the base station of the serving cell according to a frequency band used by the base station itself and the obtained frequency band usage information of all neighboring cells includes: the base station of the serving cell determining the number N of measurement frequency points and measurement bandwidths $BW_n$ at all the measurement frequency points of the mobile station which assesses the base station according to the following formula:

$$N=(B_{serv}-W_{gap})/B_{neigh}$$

$$BW_n=B_{meas}/N;$$

wherein, $BW_n$ is a measurement bandwidth at the nth measurement frequency point, $BW_1=BW_2=\ldots=BW_N$, $B_{meas}$ is a total measurement bandwidth, $B_{serv}$ is a bandwidth of the serving cell, $B_{neigh}$ is a bandwidth of the neighboring cell, $W_{gap}$ is a sum of protection bandwidths between neighboring cells; wherein, a value of N is computed by rounding, and N is a positive integer. When N>1, all the measurement frequency points are spaced on bandwidth.

For example, a bandwidth of the serving cell is 10 MHz, a bandwidth of the neighboring cell is 5 MHz, a sum of protection bandwidths is 0.5 MHz, a total measurement bandwidth is 6 RB, and with the above formula, it is to obtain that N=2 and $BW_n$ is 3 RB.

Through the preferred embodiment, it tries to distribute frequency bands for measurement into the entire system bandwidth and fully reflect an interference condition in the entire system bandwidth, which avoids the problem that it is easy to optimistically estimate a channel condition due to inadequate measurement on interferences within the bandwidths in certain scenarios when the measurement is only performed on the center 6 RB. Moreover, the measurement bandwidths are distributed evenly within the system bandwidths, and thus a comparatively accurate current channel condition of the system is reflected to the greatest extent, which solves the problem that there may be an inaccurate measurement when the measurement is only performed on the center 6 RB originally.

In the embodiment of the present document, the base station of the serving cell can indicate the measurement parameters by sending a message to the mobile station, wherein, the message carries a parameter indicating the measurement frequency points and a parameter indicating the measurement bandwidths. For example, the message can be sent through an SIB, or it can be sent by means of a control signaling.

In one preferred embodiment of the embodiments of the present document, the parameter indicating the measurement frequency points includes: a center frequency of the serving cell and offsets of all the measurement frequency points relative to the center frequency, or values of all the measurement frequency points. For example, the base station of the serving cell can send the values of all the measurement frequency points by means of an EARFCN.

In one preferred embodiment of the embodiments of the present document, the parameter indicating the measurement bandwidths can be a total measurement bandwidth, or it can also be a measurement bandwidth of a single measurement frequency point. If the parameter indicating the measurement bandwidths is the total measurement bandwidth, since the measurement bandwidths of all the measurement frequency points are identical, the mobile station can obtain the measurement bandwidth of the single measurement frequency point in combination with the total number of the measurement frequency points indicated by the parameter in the message.

In one preferred embodiment of the embodiments of the present document, each of the measurement frequency points can be a center frequency point of each of the neighboring cells, thus an accuracy of measurement can be improved.

In the embodiment of the present document, after the step of the base station of the serving cell indicating the measurement parameters to the mobile station which accesses the base station of the serving cell, the method also includes: the mobile station performing measurement according to the measurement parameters indicated by the base station of the serving cell.

Corresponding to the above base station, the embodiment of the present document also provides an improved mobile station, and the mobile station performs cell measurement according to the measurement parameters indicated by the base station of the serving cell.

The mobile station according to the embodiment of the present document can include a device for cell measurement, and it performs cell measurement through the device.

Figure 6:
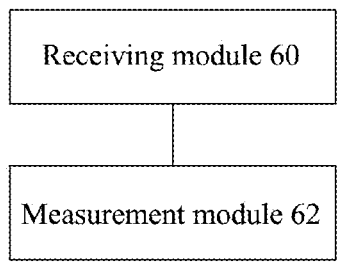
FIG. 6 is a schematic diagram of a structure of a device for cell measurement according to the embodiment of the present document.

FIG. 6 is a schematic diagram of a structure of the device for cell measurement according to the embodiment of the present document, and as shown in FIG. 6, the device for cell measurement according to the embodiment of the present document includes: a receiving module 60, configured to: receive measurement parameters indicated by a base station of a serving cell which the mobile station accesses, wherein, the measurement parameters include: measurement frequency points and measurement bandwidths at all the measurement frequency points; and a measurement module 62, configured to: be coupled with the receiving module 60, and perform cell measurement according to the measurement parameters.

In one embodiment, the measurement module 62 can be configured to perform measurement by means of: performing measurement on the measurement bandwidths at all the measurement frequency points when executing measurement every time.

Through the device for cell measurement provided in the embodiment of the present document, the measurement can be performed according to the measurement parameters indicated by the base station of the serving cell, and the measurement frequency points are not fixed at a frequency center of the serving cell, which avoids the problem that it is easy to optimistically estimate a channel condition due to inadequate measurement on interferences within the bandwidths in certain scenarios when the measurement is only performed on the center 6 RB, and avoids the problem that there may be an inaccurate measurement when the measurement is only performed on the center 6 RB, thereby improving an accuracy of measurement.

In the embodiment of the present document, the measurement parameters indicated by the base station of the serving cell are determined by the base station of the serving cell according to frequency band usage information of neighboring cells of the serving cell, which may particularly refer to the descriptions of the device and method for indicating the measurement parameters provided in the embodiments of the present document above and will not be repeated here.

According to the embodiment of the present document, a method for cell measurement is also provided, and the method can be implemented through the device for cell measurement provided in the embodiment of the present document above.

Figure 7:
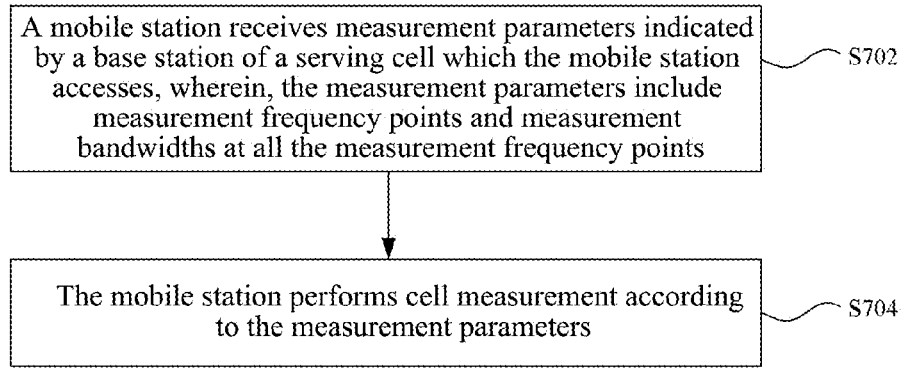
FIG. 7 is a flow chart of a method for cell measurement according to the embodiment of the present document.

FIG. 7 is a flow chart of the method for cell measurement according to the embodiment of the present document, and as shown in FIG. 7, the method mainly includes the following steps (step S702 to step S704).

In step S702, a mobile station receives measurement parameters indicated by a base station of a serving cell which the mobile station accesses, wherein, the measurement parameters include: measurement frequency points and measurement bandwidths at all the measurement frequency points.

In step S704, the mobile station performs cell measurement according to the measurement parameters.

Through the method for cell measurement provided in the embodiment of the present document, the measurement can be performed according to the measurement parameters indicated by the base station of the serving cell, and the measurement frequency points are not fixed at a frequency center of the serving cell, which avoids the problem that it is easy to optimistically estimate a channel condition due to inadequate measurement on interferences within the bandwidths in certain scenarios when the measurement is only performed on the center 6 RB, and avoids the problem that there may be an inaccurate measurement when the measurement is only performed on the center 6 RB, thereby improving an accuracy of measurement.

In the embodiment of the present document, the measurement parameters indicated by the base station of the serving cell are determined by the base station of the serving cell according to frequency band usage information of neighboring cells of the serving cell, which may particularly refer to the descriptions of the device and method for indicating the measurement parameters provided in the embodiments of the present document above and will not be repeated here.

In the embodiment of the present document, the step of a mobile station receiving measurement parameters indicated by a base station of a serving cell which the mobile station accesses includes: the mobile station receiving a message sent by the base station of the serving cell, wherein, the message carries a parameter indicating the measurement frequency points and a parameter indicating the measurement bandwidths. For example, the mobile station can receive an SIB or a control signaling sent by the base station of the serving cell.

In one embodiment of the embodiments of the present document, the parameter indicating the measurement frequency points includes: a center frequency of the serving cell and offsets of all the measurement frequency points relative to the center frequency, or values of all the measurement frequency points.

In one preferred embodiment of the embodiments of the present document, the parameter indicating the measurement frequency points can be a center frequency of the serving cell and offsets of all the measurement frequency points relative to the center frequency, or, it also can be values of all the measurement frequency points. For example, the base station of the serving cell can send the values of all the measurement frequency points by means of an EARFCN.

In one preferred embodiment of the embodiments of the present document, the measurement bandwidths at all the measurement frequency points are equal, thus it is to indicate that the parameter indicating the measurement bandwidths can be a total measurement bandwidth, or a measurement bandwidth of a single measurement frequency point. If the parameter indicating the measurement bandwidths is the total measurement bandwidth, since the measurement bandwidths of all the measurement frequency points are identical, the mobile station can obtain the measurement bandwidth of the single measurement frequency point in combination with the total number of the measurement frequency points indicated by the base station of the serving cell.

In one preferred embodiment of the embodiments of the present document, each of the measurement frequency points is a center frequency point of each of the neighboring cells, thus an accuracy of measurement can be improved.

The technical scheme provided in the embodiments of the present document will be described with the E-UTRAN system as an example below.

In the embodiment of the present document, the base station of the serving cell obtains frequency band usage conditions of neighboring cells of the serving cell through the network (as shown in FIG. 3, a communication with a base station of a neighboring cell can be performed directly via an X2 interface, or a communication with an upper layer can be performed via an S1 interface), and then according to an actual usage scenario, the base station of the serving cell indicates the mobile station which accesses the base station of the serving cell to perform appropriate measurement, and the mobile station in the serving cell performs measurement according to a measurement mode indicated by the base station.

In the embodiment of the present document, a total measurement bandwidth, measurement frequency points and measurement modes are all controlled by the network side, and they are sent to the mobile station to be executed, so as to complete the measurement action. In the embodiment of the present document, a total number of RBs for measurement is a constant value, such as 6 RB, 15 RB and 25 RB, and it can be sent by the network side to Information Element (IE) (AllowedMeasBandwidth) of UE to be controlled.

The measurement mode in the embodiment of the present document is a spaced sampling mode. That is, measurement sampling points (i.e. measurement frequency points) at a time are spaced on bandwidth, the base station can send a center frequency and offsets at the center frequency to the mobile station, or the base station can send frequency points of neighboring cells to the UE through an EARFCN. The mobile station can position the measurement frequency points according to the center frequency and offsets or the EARFCN. In the embodiment of the present document, the number of measurement frequency points and the measurement bandwidths at all the measurement frequency points can be obtained according to the following algorithms:

$$BW_n = B_{meas}/N$$

$$N = (B_{serv} - W_{gap})/B_{neigh};$$

Wherein, $BW_n$ is a measurement bandwidth of the nth (n=1, 2, ..., N) measurement frequency point, and due to an equalization, in the embodiment of the present document, $BW_1 = BW_2 = \ldots = BW_N$; $B_{meas}$ is a total measurement bandwidth, and as mentioned above, it can be 6 RB, 15 RB and 25 RB; N is a total number of measurement frequency points; $B_{serv}$ is a bandwidth of the serving cell, such as 10 MHz; $B_{neigh}$ is a bandwidth of the neighboring cell, such as 5 MHz; and $W_{gap}$ is a sum of protection bandwidths between neighboring cells, such as 0.5 MHz Descriptions will be made with the total measurement bandwidth of 6 RB as an example below.

In the embodiment, the mobile station not only performs measurement on the center 6 RB of the system bandwidth, but made multi-frequency-point narrowband measurement by dividing the 6 RB into two parts (3+3) of RB (3 RB at the center of two system carrier frequencies with 5 M bandwidth), three parts (2+2+2) of RB (2 RB at the center of three system carrier frequencies with 3 M bandwidth) or 6 parts (1+1+1+1+1+1) of RB (1 RB at the center of six system carrier frequencies with 1.4 M bandwidth) summarized as shown in Table 1 according to an indication of the base station after the base station performs calculation through the above algorithms. Specific frequency spectrum deployment scenarios are as shown in FIG. 10A-10D, which respectively correspond to 4 scenarios in Table 1.

TABLE 1

| Neighboring cell bandwidth | Serving cell (10M) |
|---|---|
| 10M | center 6RB |
| 5M | 3 + 3 RB |
| 3M | 2 + 2 + 2 RB |
| 1.4M | 1 + 1 + 1 + 1 + 1 + 1 RB |

In implementation, when the mobile station performs RRM measurement, main measurement contents include Reference Signal Receiving Power (RSRP) and Reference Signal Receiving Quality (RSRQ). For measurement on the RSRP, since it only contains signal strength measurement of Cell-specific (or Common) Reference Signal (CRS), the measurement on the RSRP is unrelated to a condition of frequency bands used by specific cells, which is not required to perform multi-frequency-point narrowband measurement. However, since the RSRP cannot reflect an interference condition on the current channel, it is required to measure the RSRQ in practical applications, wherein, RSRQ=N*RSRP/RSSI, wherein N is the number of RBs for measurement, RSSI is an E-UTRAN carrier received signal strength indicator, namely the total receiving wideband power observed by the terminal from all sources, including a serving cell and non-serving cells of a common channel, adjacent channel interference and thermal noise and so on. In order to report an accurate measurement value, the mobile station is required to perform measurement according to the measurement mode indicated by the serving base station.

Figure 8:
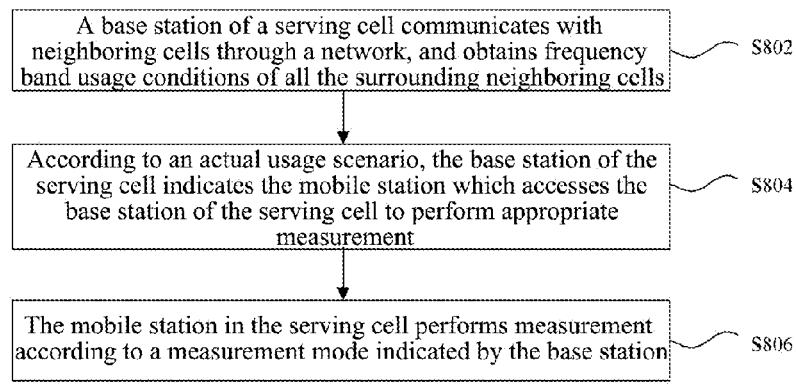
FIG. 8 is a flow chart of a method for a network side controlling measurement bandwidths of the mobile station according to the embodiment of the present document.

The embodiment will be described in detail in combination with the accompanying drawings, FIG. 8 is a flow chart of a method for a network side controlling bandwidth measurement of the mobile station according to the embodiment of the present document, and the following steps (step S802 to step S806) are included.

In step S802, a base station of a serving cell communicates with neighboring cells through the network, and obtains frequency band usage conditions of the neighboring cells of the serving cell.

In practical applications, with regard to different cells belonging to the same base station, bandwidth and frequency point information of all cells can be obtained directly within the base station, and with regard to different cells belonging to different base stations, communication can be directly performed between eNodeBs of the E-UTRAN via an X2 interface, or communication can be performed via an S1 interface with an upper layer, thus the base station of the serving cell can obtain a condition of bandwidths and frequency points used by the neighboring cell systems through a communication between the base station of the serving cell and the base station of the neighboring cell.

In step S804, according to an actual usage scenario, the base station of the serving cell indicates the mobile station which accesses the base station of the serving cell to perform appropriate measurement.

The base station of the serving cell decides how the mobile station which accesses the base station of the serving cell to perform measurement according to the information obtained in step S802.

The base station of the serving cell computes the number of measurement frequency points and measurement bandwidths at all the measurement frequency points through the following formulas:

$$BW_n = B_{meas}/N$$

$$N = (B_{serv} - W_{gap})/B_{neigh}.$$

Then, the base station sends measurement information to the mobile station, the information can be sent through an SIB, and also the control can be made by means of controlling signaling, the sent contents can be a form of a center frequency of the serving cell and offsets at the center carrier frequency plus a measurement bandwidth of each measurement frequency point, or a form of an EARFCN of measurement frequency point plus a measurement bandwidth of each measurement frequency point.

In step S806, the mobile station in the serving cell performs measurement according to the measurement mode indicated by the base station in step S804. In order to maintain an appropriate connection with the network, the mobile station is required to perform a process of measurement and reporting, a measurement object is an intra-frequency, inter-frequency or inter-system CRS or Channel State Information Reference Signal (CSI-RS), an average value obtained by averaging measurement values within all the measurement frequency points is taken as a value of one measurement, then the value is filtered through layer 1 and layer 3, and a processed measurement value is reported to the base station of the serving cell, thus the network can perform appropriate scheduling and service for the base station of the serving cell.

Figure 9:
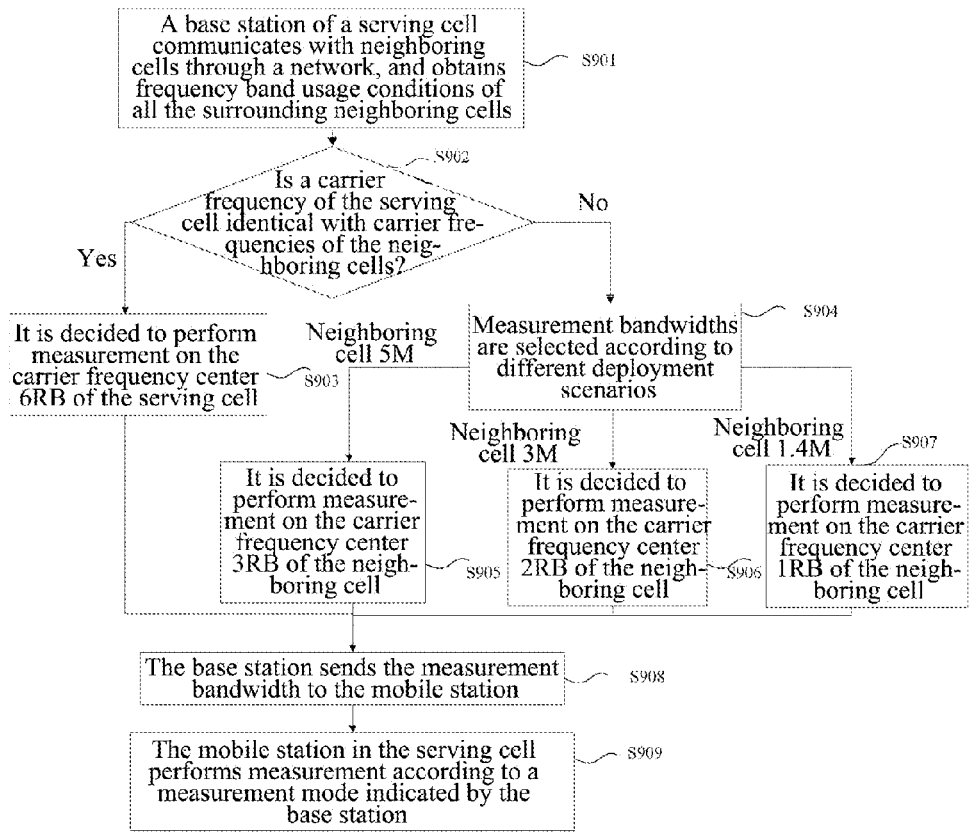
FIG. 9 is a flow chart of the base station performing measurement bandwidth selection according to the preferred embodiment of the present document.

In combination with scenarios shown in FIG. 10A-10B, and by taking the total measurement bandwidth of 6 RB as an example, a method for the base station of the serving cell selecting measurement bandwidth according to the embodiment of the present document will be described below. FIG. 9 is a flow chart of the base station selecting measurement bandwidth with respect to different cell scenarios in the embodiment, and as shown in FIG. 9, the flow mainly includes the following steps.

In step S901, a base station of a serving cell communicates with neighboring cells through the network, and obtains frequency band usage conditions of the neighboring cells of the serving cell.

In step S902, the base station of the serving cell judges whether a carrier frequency of the serving cell is identical with carrier frequencies of the neighboring cells, if yes, step S903 is executed, and if not, step S904 is executed.

Figure 10A:
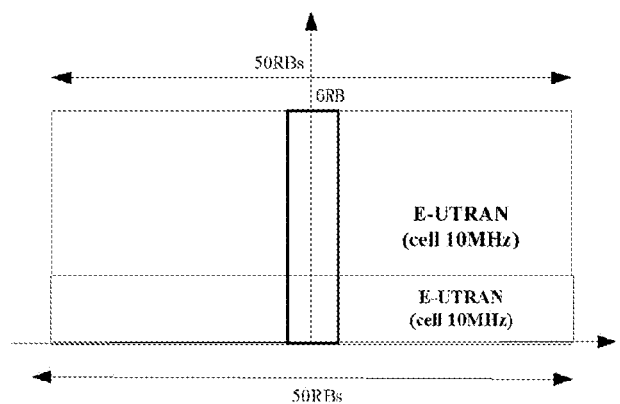
FIG. 10A is a schematic diagram of a scenario 1 of measurement bandwidth selection according to the embodiment of the present document.

In step S903, the neighboring cells and the serving cell use the same frequency band, a cell deployment scenario is as shown in FIG. 10A, the base station of the serving cell performs calculation according to the following formulas and determines that the mobile station which accesses the base station of the serving cell is appropriate for ordinary narrowband measurement, and the measurement bandwidth is the carrier center 6 RB:

$$BW_n = B_{meas}/N$$

$$N = (B_{serv} - W_{gap})/B_{neigh}.$$

In step S904, the neighboring cells and the serving cell use different frequency bands, the base station of the serving cell judges a frequency band of the neighboring cell, if the frequency band of the neighboring cell is 5 M, step S905 is executed, if the frequency band of the neighboring cell is 3 M, step S906 is executed, and if the frequency band of the neighboring cell is 1.4 M, step S907 is executed.

Figure 10B:
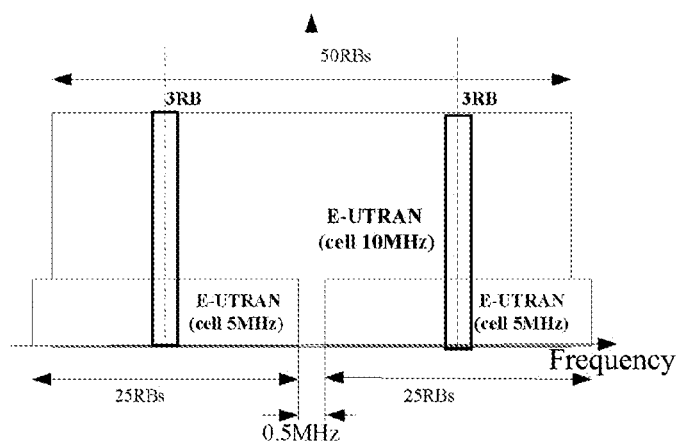
FIG. 10B is a schematic diagram of a scenario 2 of measurement bandwidth selection according to the embodiment of the present document.

In step S905, the frequency band of the neighboring cell is 5 M, a cell deployment scenario is as shown in FIG. 10B, a sum of protection bandwidths is 0.5 MHz, and the base station of the serving cell performs calculation according to the following formulas:

$$BW_n = B_{meas}/N$$

$$N = (B_{serv} - W_{gap})/B_{neigh}.$$

The base station judges that the mobile station which accesses the base station is appropriate to perform multi-frequency-point narrowband measurement, the number of measurement frequency points is 2, the measurement bandwidth of each frequency point is 3 RB, it is a form of (3+3) RB, the measurement bandwidth is divided into two parts, which are located on the carrier center 3 RB of the neighboring cells respectively, and each part is 3 RB.

Figure 10C:
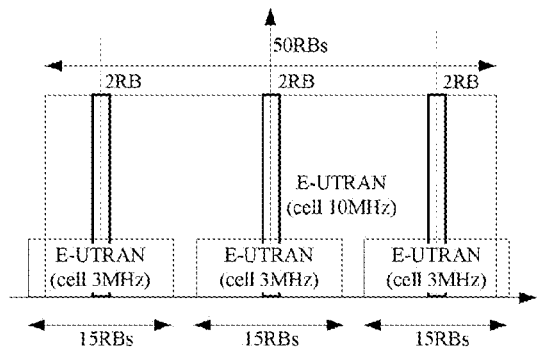
FIG. 10C is a schematic diagram of a scenario 3 of measurement bandwidth selection according to the embodiment of the present document.

In step S906, the frequency band of the neighboring cell is 3 M, a cell deployment scenario is as shown in FIG. 10C, a sum of protection bandwidths is 0.3+0.3=0.6 MHz, and the base station of the serving cell performs calculation according to the following formulas:

$$BW_n = B_{meas}/N$$

$$N = (B_{serv} - W_{gap})/B_{neigh}.$$

The base station judges that the mobile station which accesses the base station is appropriate to perform multi-frequency-point narrowband measurement, the number of measurement frequency points is 3, the measurement bandwidth of each frequency point is 2 RB, it is a form of (2+2+2) RB, the measurement bandwidth is divided into three parts, which are located on the carrier center 2 RB of the neighboring cells respectively, and each part is 2 RB.

Figure 10D:
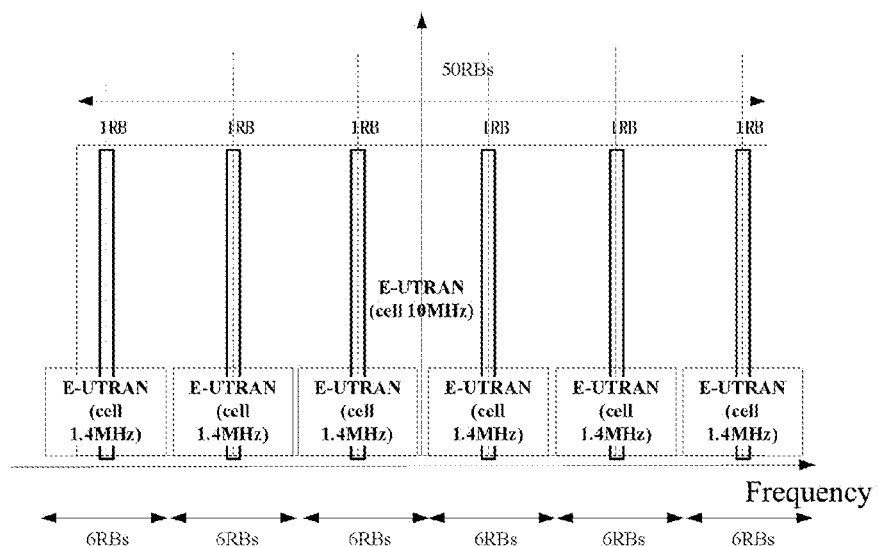
FIG. 10D is a schematic diagram of a scenario 4 of measurement bandwidth selection according to the embodiment of the present document.

In step S907, the frequency band of the neighboring cell is 1.4 M, a cell deployment scenario is as shown in FIG. 10D, a sum of protection bandwidths is 0.14+0.14+0.14+ 0.14+0.14=0.7 MHz, and the base station of the serving cell performs calculation according to the following formulas:

$$BW_n = B_{meas}/N$$

$$N = (B_{serv} - W_{gap})/B_{neigh}.$$

The base station judges that the mobile station which accesses the base station is appropriate to perform multi-frequency-point narrowband measurement, the number of measurement frequency points is 6, the measurement bandwidth of each frequency point is 1 RB, it is a form of (1+1+1+1+1+1) RB, the measurement bandwidth is divided into six parts, which are located on the carrier center 1 RB of the neighboring cells respectively, and each part is 1 RB.

In step S908, the base station of the serving cell notifies the selected measurement bandwidth and measurement frequency point to the mobile station through a signaling.

In step S909, the mobile station in the serving cell performs measurement according to the measurement mode indicated by the base station.

In the embodiment of the present document, the mobile station performs normal measurement according to an indication of the base station of the serving cell. One measurement is performed at every certain measurement period (e.g. 40 ms), the mobile station can perform measurement at each measurement frequency point indicated by the base station according to the measurement bandwidth at the measurement frequency point indicated by the base station when executing the measurement every time. An average value of multiple continuous measurements (e.g. 5 measurements) is taken as a measurement value within this period of time window through the layer 1 filtering, then a measurement result reported last time and a measurement value of this time are weighted through the layer 3 filtering to serve as a measurement value reported this time, and the mobile station reports the measurement value to the base station so as to complete the whole measurement action.

With the above technical scheme provided in the embodiment of the present document, the system can perform RRM measurement bandwidth selection through control of the network side according to different cell deployment scenarios. It tries to distribute frequency bands for measurement into the entire system bandwidth, fully reflect an interference condition with the bandwidths of the entire system, obtain frequency domain diversities in the measurement to the greatest extent, and reflect a comparatively accurate current channel condition of the system, which solves the problem that there may be an inaccurate measurement due to different deployment scenarios when the measurement is only performed on the center 6 RB originally. Such more flexible RRM measurement bandwidth selection means can be better adapted to the current increasingly complex mobile communication environment, thereby guaranteeing an accuracy of measurement.

Apparently, the skilled in the art should understand that the modules or steps of the present document mentioned above can be implemented through a universal calculating device, and they can be concentrated on a single calculating device or distributed in a network consisting of multiple calculating devices. Alternatively, the modules or steps can be implemented through program codes which can be executed by the calculating device, thus, they can be stored in a storage device to be executed by the calculating device, and in some cases, the illustrated or described steps can be executed in a sequence different from here, or they can be made into multiple integrated circuit modules respectively or multiple function modules or steps of them can be made into a single integrated circuit module to be implemented. Therefore, the embodiments of the present document are not limited to any combination of hardware and software in a specific form.

The above description is only the preferred examples of the present document, which is not used to limit the present document. The embodiments of the present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

Through the method and device of the embodiments of the present document, the problem that the narrowband measurement of the mobile station of the serving cell is inaccurate in a scenario of different cells using different bandwidths is solved, thereby improving a flexibility of measurement bandwidths and an accuracy of measurement.

What is claimed is:

1. A method for indicating measurement parameters, comprising:

in a scenario that a serving cell and neighboring cells use different bandwidths, a serving base station of the serving cell acquiring frequency band usage information of neighboring cells of the serving cell, wherein, the frequency band usage information comprises: carrier frequencies of the neighboring cells and system bandwidths of the neighboring cells;

according to a frequency band used by the serving base station itself and the frequency band usage information of all the neighboring cells, the serving base station of the serving cell determining measurement parameters of a mobile station which accesses the serving base station of the serving cell, wherein, the measurement parameters comprise: measurement frequency points and measurement bandwidths at the measurement frequency points; and $N=(B_{serv}-W_{gap})/B_{neigh}$ $BW_n=B_{meas}/N$ wherein $BW_n$ is a measurement bandwidth at an nth measurement frequency point, $BW_1=BW_2=\ldots=BW_N$, $B_{meas}$ is a total measurement bandwidth, $B_{serv}$ is a bandwidth of the serving cell, $B_{neigh}$ is a bandwidth of the neighboring cell, $W_{gap}$ is a sum of protection bandwidths between neighboring cells, a value of N is computed by rounding, and N is a positive integer; and the serving base station of the serving cell indicating the measurement parameters to the mobile station which accesses the serving base station of the serving cell.

2. The method according to claim 1, wherein, the step of a serving base station of a serving cell acquiring frequency band usage information of neighboring cells of the serving cell comprises:

with regard to a neighboring cell belonging to the serving base station of the serving cell, the serving base station of the serving cell acquiring locally stored frequency band usage information of the neighboring cell; and with regard to a neighboring cell which is not belonging to the serving base station of the serving cell, the serving base station of the serving cell acquiring frequency band usage information of the neighboring cell from a neighboring base station of the neighboring cell via an interface between the serving base station of the serving cell and the neighboring base station of the neighboring cell, or the serving base station of the serving cell acquiring frequency band usage information of the neighboring cell by communicating with an upper layer via an interface.

3. The method according to claim 1, wherein, in the step of the serving base station of the serving cell determining measurement parameters of a mobile station which accesses the serving base station of the serving cell according to a frequency band used by the serving base station itself and the obtained frequency band usage information of all the neighboring cells, when it is determined that a number N of measurement frequency points of the mobile station which accesses the serving base station of the serving cell >1, a sum of the measurement bandwidths at all the measurement frequency points is a total measurement bandwidth, wherein, N is a positive integer.

4. The method according to claim 3, wherein, the step of the serving base station of the serving cell indicating the measurement parameters to the mobile station which accesses the serving base station of the serving cell comprises:

the serving base station of the serving cell sending a message to the mobile station, wherein, the message carries a parameter indicating the measurement frequency points and a parameter indicating the measurement bandwidths.

5. The method according to claim 4, wherein, the parameter indicating the measurement frequency points comprises: a center frequency of the serving cell and offsets of all the measurement frequency points relative to the center frequency of the serving cell, or values of all the measurement frequency points;

or, the measurement bandwidths at all the measurement frequency points are equal; the parameter indicating the measurement bandwidths comprises: the total measurement bandwidth, or a measurement bandwidth of a single measurement frequency point;

or, the message is sent through a System Information Block (SIB) or a control signaling.

6. The method according to claim 3, wherein, each of the measurement frequency points is a center frequency point of each of the neighboring cells.

7. The method according to claim 1, wherein, after the step of the serving base station of the serving cell indicating the measurement parameters to the mobile station which accesses the serving base station of the serving cell, the method further comprises:

the mobile station performing measurement according to the measurement parameters indicated by the serving base station of the serving cell.

8. A device for indicating measurement parameters, located in a first base station, comprising a processor and a memory for storing computer executable instructions that, when executed by the processor, cause the processor to perform the steps in the following modules:

an acquisition module, configured to: in a scenario that a serving cell and neighboring cells use different bandwidths, acquire frequency band usage information of neighboring cells of the serving cell, wherein, the frequency band usage information comprises: carrier frequencies of the neighboring cells and system bandwidths of the neighboring cells;

a determination module, configured to: according to a frequency band used by the first base station and the obtained frequency band usage information of all the neighboring cells, determine measurement parameters of a mobile station which accesses the first base station, wherein, the measurement parameters comprise: measurement frequency points and measurement bandwidths at all the measurement frequency points; and $$N=(B_{serv}-W_{gap})/B_{neigh}$$

$$BW_n=B_{meas}/N$$

wherein $BW_n$ is a measurement bandwidth at an nth measurement frequency point, $BW_1=BW_2=\ldots=BW_N$, $B_{meas}$ is a total measurement bandwidth, $B_{serv}$ is a bandwidth of the serving cell, $B_{neigh}$ is a bandwidth of the neighboring cell, $W_{gap}$ is a sum of protection bandwidths between neighboring cells, a value of N is computed by rounding, and N is a positive integer; and an indication module, configured to: indicate the measurement parameters to the mobile station which accesses the first base station.

9. The device according to claim 8, wherein, the acquisition module comprises:
a first acquisition unit, configured to: with regard to a neighboring cell belonging to the first base station, acquire locally stored frequency band usage information of the neighboring cell; and
a second acquisition unit, configured to: with regard to a neighboring cell which is not belonging to the first base station, acquire frequency band usage information of the neighboring cell from a second base station of the neighboring cell via an interface between the first base station and the second base station of the neighboring cell, or acquire frequency band usage information of the neighboring cell by performing communication with an upper layer via an interface.

10. A method for cell measurement, comprising: in a scenario that a serving cell and neighboring cells use different bandwidths, a mobile station receiving measurement parameters indicated by a base station of the serving cell which the mobile station accesses, wherein, the measurement parameters comprise: measurement frequency points and measurement bandwidths at all the measurement frequency points; and $$N=(B_{serv}-W_{gap})/B_{neigh}$$

$$BW_n=B_{meas}/N$$

wherein $BW_n$ is a measurement bandwidth at an nth measurement frequency point, $BW_1=BW_2=\ldots=BW_N$, $B_{meas}$ is a total measurement bandwidth, $B_{serv}$ is a bandwidth of the serving cell, $B_{neigh}$ is a bandwidth of the neighboring cell, $W_{gap}$ is a sum of protection bandwidths between neighboring cells, a value of N is computed by rounding, and N is a positive integer; and
the mobile station performing cell measurements according to the measurement parameters.

11. The method according to claim 10, wherein, the step of a mobile station receiving measurement parameters indicated by a base station of a serving cell which the mobile station accesses comprises:
the mobile station receiving a message sent by the base station of the serving cell, wherein, the message carries a parameter indicating the measurement frequency points and a parameter indicating the measurement bandwidths.

12. The method according to claim 11, wherein, the parameter indicating the measurement frequency points comprises a center frequency of the serving cell and offsets of all the measurement frequency points relative to the center frequency of the serving cell, or values of all the measurement frequency points.

13. The method according to claim 11, wherein, the measurement bandwidths at all the measurement frequency points are equal, and a sum of the measurement bandwidths at all the measurement frequency points is a total measurement bandwidth; the parameter indicating the measurement bandwidths comprises: the total measurement bandwidth, or a measurement bandwidth of a single measurement frequency point.

14. The method according to claim 11, wherein, the message is sent through a System Information Block (SIB) or a control signaling.

15. The method according to claim 10, wherein, each of the measurement frequency points is a center frequency point of each of the neighboring cells.

16. The method according to claim 10, wherein, the step of the mobile station performing cell measurement according to the measurement parameters comprises:
the mobile station performing measurement on the measurement bandwidths at all the measurement frequency points when executing measurement every time.

17. A device for cell measurement, located in a mobile station, comprising a processor and a memory for storing computer executable instructions that, when executed by the processor, cause the processor to perform the steps in the following modules:
a receiving module, configured to: in a scenario that a serving cell and neighboring cells use different bandwidths, receive measurement parameters indicated by a base station of a serving cell which the mobile station accesses, wherein, the measurement parameters comprise: measurement frequency points and measurement bandwidths at all the measurement frequency points; and $$N=(B_{serv}-W_{gap})/B_{neigh}$$

$$BW_n=B_{meas}/N$$

wherein $BW_n$ is a measurement bandwidth at an nth measurement frequency point, $BW_1=BW_2=\ldots=BW_N$, $B_{meas}$ is a total measurement bandwidth, $B_{serv}$ is a bandwidth of the serving cell, $B_{neigh}$ is a bandwidth of the neighboring cell, $W_{gap}$ is a sum of protection bandwidths between neighboring cells, a value of N is computed by rounding, and N is a positive integer; and
a measurement module, configured to: perform cell measurement according to the measurement parameters.

18. The device according to claim 17, wherein, the measurement module is configured to perform measurement by means of performing measurement on the measurement bandwidths at all the measurement frequency points when executing measurement every time.

* * * * *